US012757303B2

(12) United States Patent
Lee et al.

(10) Patent No.: US 12,757,303 B2
(45) Date of Patent: Oct. 6, 2026

(54) MICRO LED PIXEL CIRCUIT DRIVEN BY PWM

(71) Applicant: SEOUL NATIONAL UNIVERSITY R&DB FOUNDATION, Seoul (KR)

(72) Inventors: Soo-Yeon Lee, Seoul (KR); Kyeong-Soo Kang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 102 days.

(21) Appl. No.: 18/942,917

(22) Filed: Nov. 11, 2024

(65) Prior Publication Data

US 2025/0193980 A1 Jun. 12, 2025

(30) Foreign Application Priority Data

Dec. 6, 2023 (KR) ........................ 10-2023-0175006

(51) Int. Cl.

*H05B 45/345* (2020.01)
*G09G 3/32* (2016.01)
*H05B 45/325* (2020.01)

(52) U.S. Cl.

CPC ............ *H05B 45/345* (2020.01); *G09G 3/32* (2013.01); *H05B 45/325* (2020.01); *G09G 2310/027* (2013.01)

(58) Field of Classification Search

None

See application file for complete search history.

(56) References Cited

U.S. PATENT DOCUMENTS 11,217,154 B2 * 1/2022 Jeong ....................... G09G 5/18

FOREIGN PATENT DOCUMENTS

| | | |
|---|---|---|
| KR | 10-2021-0064045 A | 6/2021 |
| KR | 10-2022-0088130 A | 6/2022 |
| KR | 10-2436531 B1 | 8/2022 |
| KR | 10-2023-0013608 A | 1/2023 |

* cited by examiner

*Primary Examiner* — Kenneth B Wells

(74) *Attorney, Agent, or Firm* — Bridgeway IP Law Group, PLLC; Jihun Kim

(57) ABSTRACT

A micro LED pixel circuit driven by a PWM includes a sweep signal generation unit configured to output a sweep signal of which slope is adjusted according to grayscale data, a constant current control unit configured to supply a constant current and controls whether to stop supply of the constant current according to the sweep signal output by the sweep signal generation unit, and a micro LED driven by the constant current.

7 Claims, 18 Drawing Sheets

MICRO LED PIXEL CIRCUIT DRIVEN BY PWM

CROSS-REFERENCE TO RELATED APPLICATION

This application is based on and claims priority under 35 U.S.C. § 119 to Korean Patent Application No. 10-2023-0175006, filed on Dec. 6, 2023, in the Korean Intellectual Property Office, the disclosure of which is incorporated by reference herein in its entirety.

BACKGROUND

1. Field

The present disclosure relates to a micro LED pixel circuit driven using a pulse width modulation (PWM).

2. Description of the Related Art

It is known that a micro light emitting diode (hereinafter, referred to as a micro LED) display may achieve a higher resolution, lower power consumption, and improved temperature stability compared to an organic LED (OLED) display. In particular, the micro LED has an advantage of not having a burn-in problem because the micro LED utilizes an inorganic material for a light emitting layer. However, a wavelength of light emitting from the micro LED shifts according to current density, which may cause color distortion. Therefore, a PWM drive, which supplies a constant current while adjusting the light emission time to express grayscale, has to be applied to the micro LED display.

When implementing the PWM drive based on a pixel circuit, a ramp signal called SWEEP is generally used to control switching of a driving thin film transistor (DRT) of PWM. DRT switching of the PWM directly affects a DRT operation of a constant current generation (CCG) section to cause a constant current generation circuit to stop supplying a current to the micro LED. However, a sweep signal-based scheme inherently involves a falling time of several hundred microseconds until flowing of a current stops. This is because the DRT of the PWM does not function as an ideal switch, and a sweep signal also has a certain slope.

The falling time of several hundred microseconds may be a significant problem in grayscale expression, especially for low grayscales where an emission period is shorter than the falling time. Generally, a peak current starts to decrease around 60 to 90 grayscales, and the falling time decreases as a current waveform deteriorates. The results indicate that an operation is not proceeding as intended. Therefore, reducing the falling time of a constant current may be the most important task for stable grayscale expression of the micro LED display.

Recently, a method for adopting an inverter in a PWM circuit to reduce the falling time has been studied. Because a slope of a sweep signal changes steeply when the sweep signal passes through the inverter, the falling time may be shortened. However, it can be seen that, even when the inverter is applied to the pixel circuit, there is still a limit due to the falling time in grayscale expression of 37G or less.

Therefore, the present disclosure proposes a new driving method for adjusting a slope of a sweep signal itself as a method for accurately expressing extremely low grayscales.

Related art includes Korean Patent Publication No. 10-2023-0013608 (Title of the Invention: DISPLAY APPARATUS)

SUMMARY

The present disclosure provides a micro LED pixel circuit capable of adjusting a slope of a sweep signal according to grayscale data.

However, technical objects to be achieved by the present embodiments are not limited to the technical objects described above, and there may be other technical objects.

According to an aspect of the present disclosure, a micro LED pixel circuit driven using PWM includes a sweep signal generation unit configured to output a sweep signal of which slope is adjusted according to grayscale data, a constant current control unit configured to supply a constant current and control whether to stop supply of the constant current according to the sweep signal output by the sweep signal generation unit, and a micro LED driven by the constant current.

According to another aspect of the present disclosure, a micro LED display includes a plurality of micro LED pixel circuits.

According to a configuration of the present disclosure, a slope of a sweep signal itself is adjusted according to grayscale data, and in particular, the slope of the sweep signal is set to be the largest for low-grayscale data, and thus, the falling time of a constant current may be dramatically reduced even for low-grayscale data compared to the well-known technology.

DETAILED DESCRIPTION

Figure 1A:
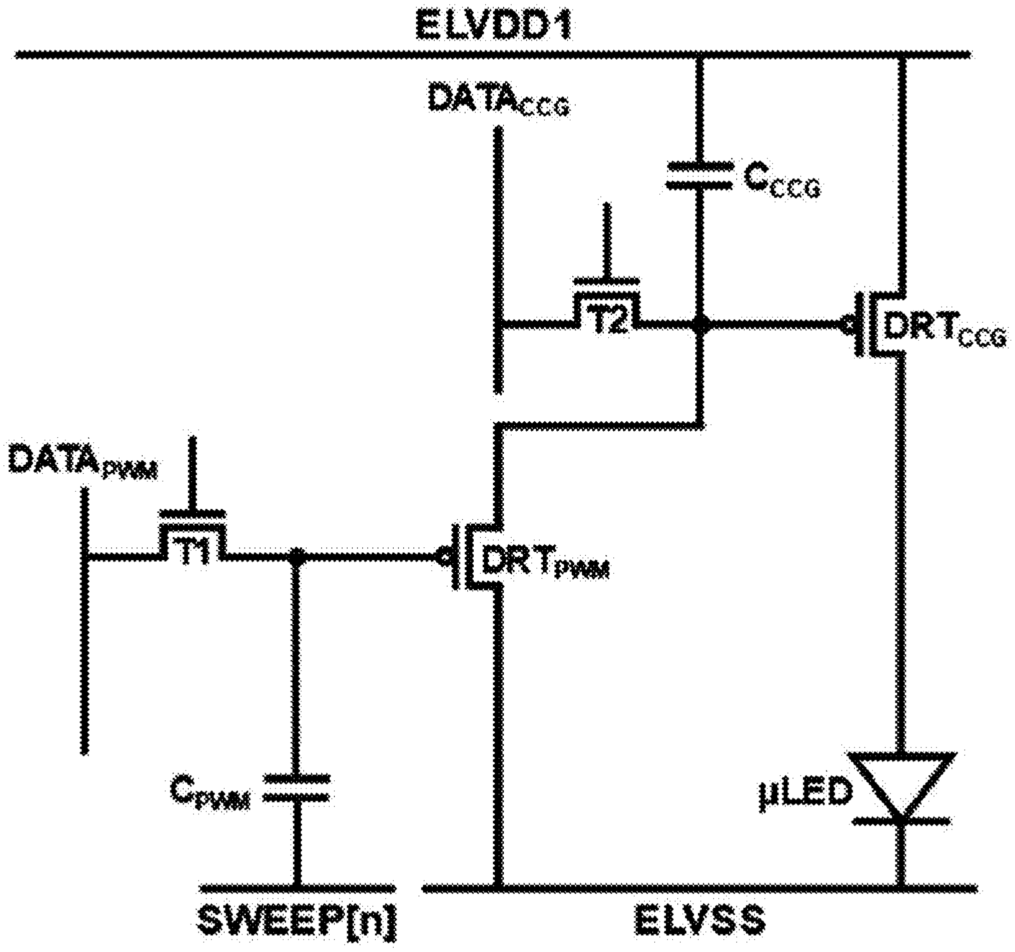
FIG. 1A PRIOR ART
FIGS. 1A and 1B illustrate problems of the well-known micro LED pixel circuit.

Hereinafter, embodiments of the present disclosure will be described in detail with reference to the attached drawings such that those skilled in the art to which the present disclosure belongs may easily practice the present disclosure. However, the present disclosure may be implemented in various different forms and is not limited to the embodiments described herein. In addition, in order to clearly describe the present disclosure in the drawings, parts that are not related to the description are omitted, and similar components are given similar reference numerals throughout the specification.

In the entire specification of the present disclosure, when a component is described to be "connected" to another component, this includes not only a case where the component is "directly connected" to another component but also a case where the component is "electrically connected" to another component with another element therebetween. In addition, when a portion "includes" a certain component, this does not exclude other components, and means to "include" other components unless otherwise described.

When it is described that a member is "on" another member throughout the specification, this includes not only a case where a member is in contact with another member, but also a case where there is another member between the two members.

Hereinafter, preferred embodiments of the present disclosure will be described in detail with reference to the attached drawings and the contents described below. However, the present disclosure is not limited to the embodiments described herein and may be embodied in other forms. The same reference numbers represent the same components throughout the specification.

Figure 1B:
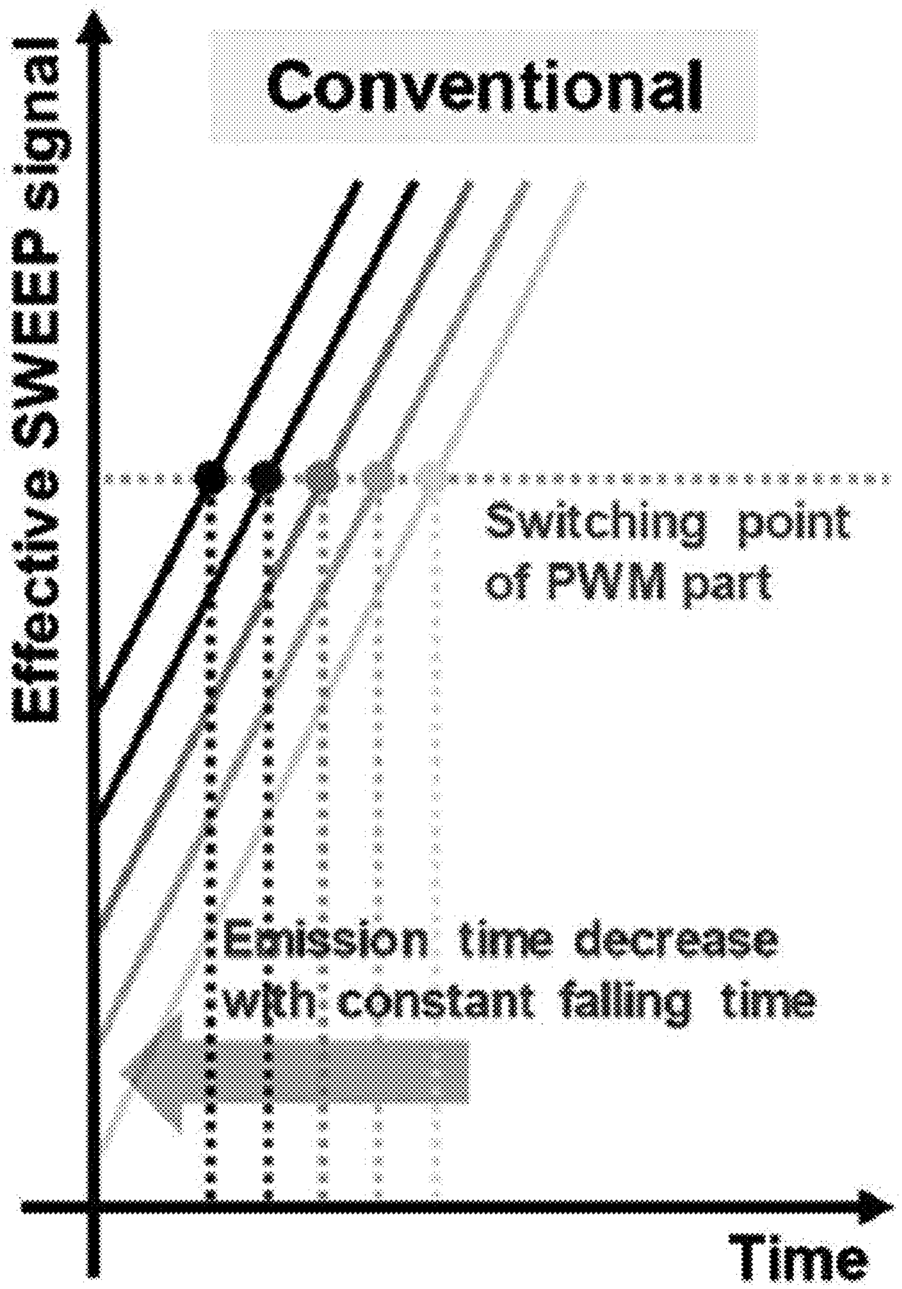
FIG. 1B PRIOR ART

FIGS. 1A and 1B illustrate problems of the well-known micro light emitting diode (LED) pixel circuit.

As illustrated in FIG. 1A, a circuit for generating a pulse width modulation (PWM) signal receives a PWM data voltage DATAPWM through a first switching element T1 and stores the PWM data voltage DATAPWM in a first capacitor CPWM. In addition, a lower end of the first capacitor CPWM receives a sweep signal having a shape illustrated in FIG. 1B. In this case, the sweep signal has a slope of the same voltage waveform regardless of a grayscale of data and is supplied from the outside of a pixel circuit. Because a voltage stored in the first capacitor CPWM changes according to the PWM data voltage DATAPWM, turn-on and turn-off times of a first drive element DRTPWM change, and accordingly, the light emission time may be adjusted.

In addition, a constant current control circuit receives a constant current source data voltage $DATA_{CCG}$ through a second switching element T2 and stores the constant current source data voltage $DATA_{CCG}$ in a second capacitor $C_{CCG}$. Based on the voltage stored in the second capacitor $C_{CCG}$, a second drive element $DRT_{CCG}$ supplies a constant current to the micro LED. In this case, when the first drive element $DRT_{PWM}$ turns on, the voltage stored in the second capacitor $C_{CCG}$ is discharged, and accordingly, the second drive element $DRT_{CCG}$ may no longer supply a current, and thereby, the light emission of the micro LED is terminated.

As illustrated in FIG. 2B, sweep signals have the same slope regardless of grayscale, and accordingly, falling times of constant currents are equal to each other, and thereby, a problem occurs in which it is difficult to accurately express low grayscale.

Figure 2:
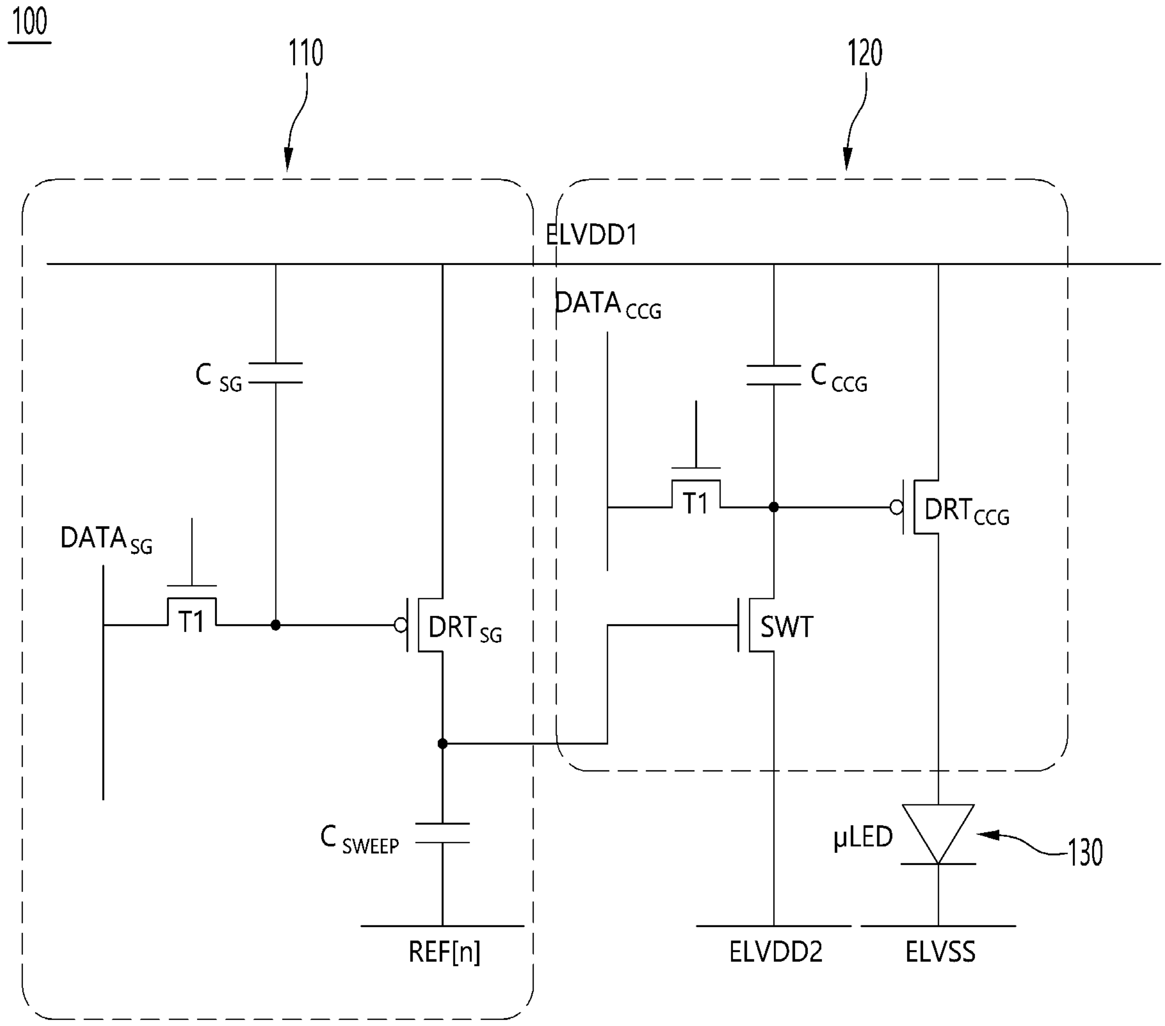
FIG. 2 illustrates a micro LED pixel circuit according to an embodiment of the present disclosure.
Figure 3:
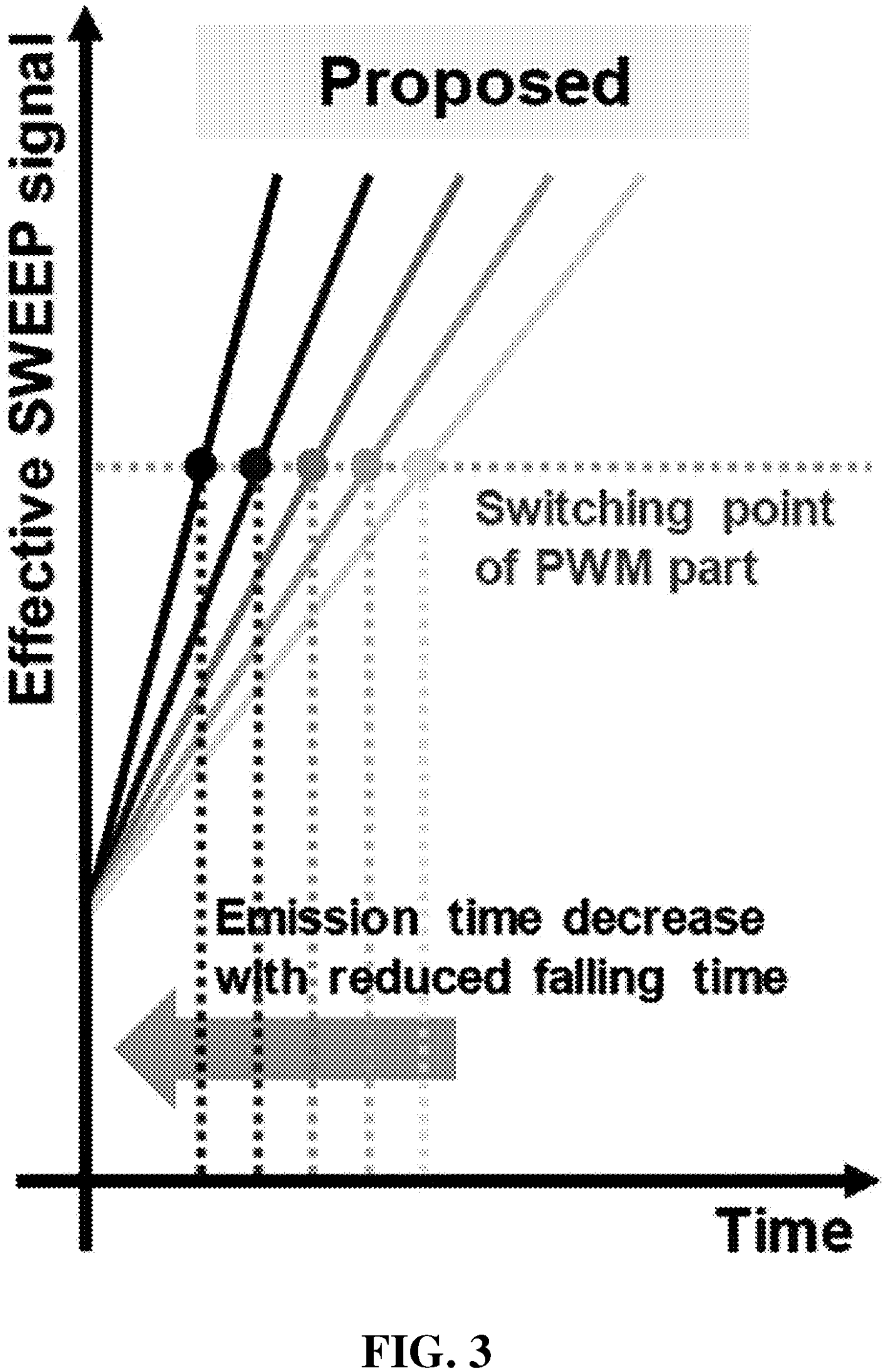
FIG. 3 illustrates sweep signals output by a micro LED pixel circuit according to an embodiment of the present disclosure.

FIG. 2 illustrates a micro LED pixel circuit according to an embodiment of the present disclosure, and FIG. 3 illustrates sweep signals output by the micro LED pixel circuit according to the embodiment of the present disclosure.

A micro LED pixel circuit 100 is driven using PWM and includes a sweep signal generation unit 110, a constant current control unit 120, and a micro LED 130.

The sweep signal generation unit 110 outputs a sweep signal of which slope is adjusted according to grayscale data.

The constant current control unit 120 controls whether to block constant current supply according to the sweep signal output by the sweep signal generation unit 110.

The micro LED 130 is driven according to the constant current supplied by the constant current control unit 120.

The grayscale data includes multiple pieces of data representing a low grayscale and a high grayscale, and the sweep signal generation unit 110 generates the sweep signal such that a slope of a voltage waveform of the sweep signal increases as the grayscale represented by the grayscale data decreases. Accordingly, the constant current control unit 120 may cause a falling time of the constant current to decrease as the slope of the sweep signal increases.

For a more detailed configuration, the sweep signal generation unit 110 includes a first capacitor CSG of which voltage is charged according to grayscale data DATASG, a drive element DRTSG that generates a current that is transmitted to a second capacitor CSWEEP based on the voltage charged to the first capacitor CSG, and a second capacitor CSWEEP in which a current generated by the drive element DRTSG is charged based on the voltage charged to the first capacitor CSG. A voltage charged to the second capacitor CSWEEP is output as a sweep signal. In addition, the sweep signal generation unit 110 may further include a switching element T1 that transmits the grayscale data DATASG to the first capacitor CSG.

The sweep signal generation unit 110 operates so that the drive element $DRT_{SG}$ charges the second capacitor $C_{SWEEP}$ based on the voltage charged to the first capacitor $C_{SG}$. In this way, the voltage charged to the first capacitor $C_{SG}$ changes according to the grayscale data $DATA_{SG}$, and accordingly, a magnitude of the current charged to the second capacitor $C_{SWEEP}$ changes, and a slope of a voltage waveform of the sweep signal generated thereby changes. That is, as a grayscale indicated by the grayscale data $DATA_{SG}$ decreases, the voltages charged to the first capacitor $C_{SG}$ and the second capacitor $C_{SWEEP}$ increase rapidly, which subsequently leads to a decrease in the falling time of the constant current. In this way, the light emission time and the falling time for each grayscale may be adjusted based on a difference in the slope of the voltage waveform.

As illustrated in FIG. 3, the present disclosure generates a sweep signal in a form in which the slope of the voltage waveform changes more steeply as the grayscale decreases. There is a clear technical difference from the fact that the sweep signal of FIG. 1 has the same slope regardless of the grayscale.

The constant current control unit 120 includes a first capacitor $C_{CCG}$ in which a constant current source data voltage is charged, a drive element $DRT_{CCG}$ that transmits a constant current to the micro LED 130 according to the voltage charged in the first capacitor $C_{CCG}$, and a switching element SWT that discharges the voltage charged in the first capacitor $C_{CCG}$ and turns off the drive element $DRT_{CCG}$ when the sweep signal output by the sweep signal generation unit 110 is higher than a preset voltage. In this way, the constant current supply to the micro LED 130 is stopped as the drive element $DRT_{CCG}$ is turned off. In this case, the steeper the slope of the voltage waveform of the sweep signal, the faster the switching element SWT is turned on, and accordingly, the drive element $DRT_{CCG}$ is turned off more quickly to quickly reduce a light emission time of the micro LED 130 and a falling time of the constant current.

Figure 4:
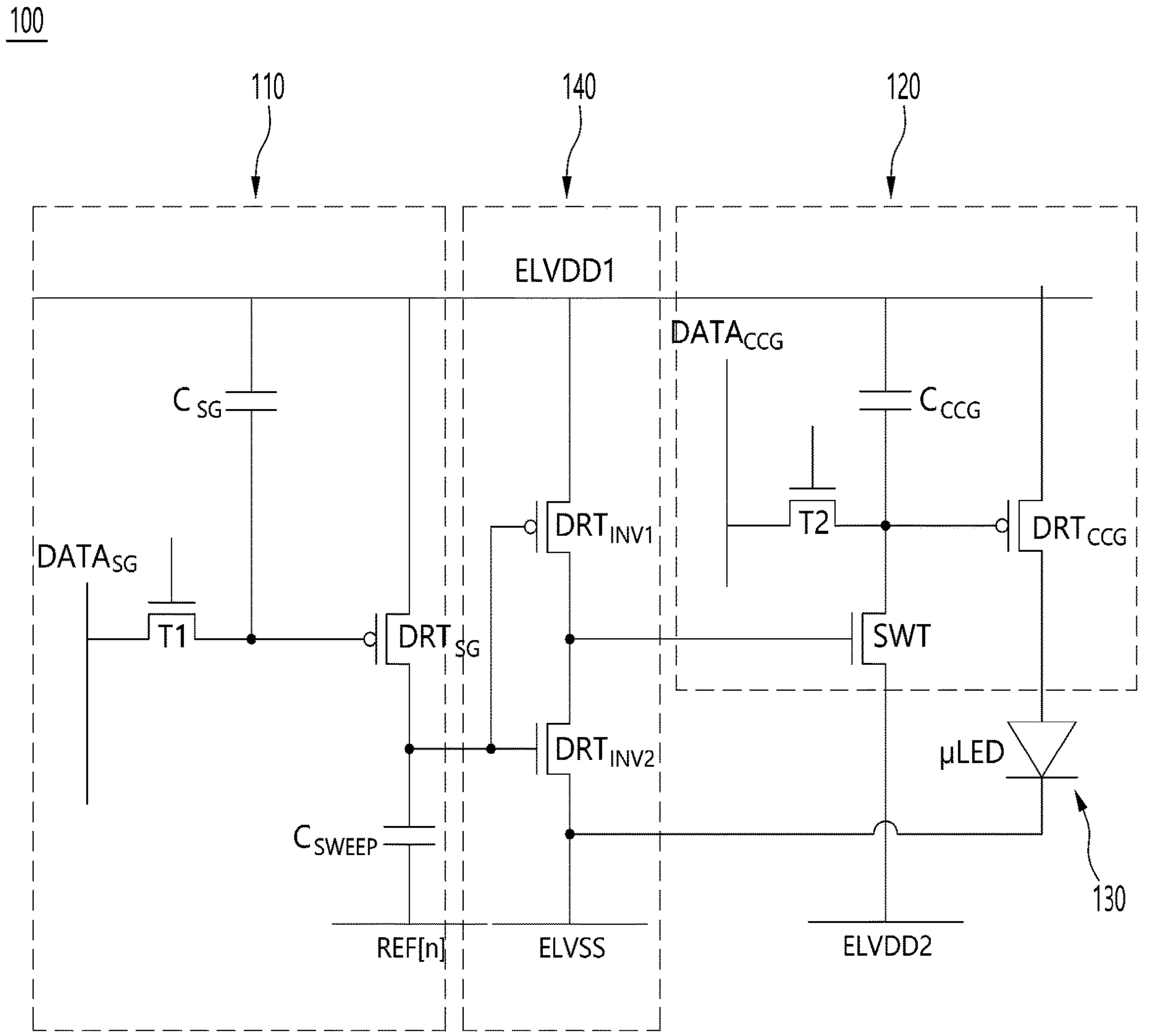
FIG. 4 illustrates a micro LED pixel circuit according to another embodiment of the present disclosure.

FIG. 4 illustrates a micro LED pixel circuit according to another embodiment of the present disclosure.

FIG. 4 is different from FIG. 2 in that an inverter 140 is added.

The inverter 140 is connected between the sweep signal generation unit 110 and the constant current control unit 120 and causes the constant current control unit 120 to output a signal for blocking the constant current supply when the sweep signal exceeds a preset voltage.

The inverter 140 may include a first drive element $DRT_{INV1}$ of a first polarity and a second drive element $DRT_{INV2}$ of a second polarity, which are connected in series between the first power supply voltage ELVDD1 and the ground voltage ELVSS. In this case, a gate of the first drive element $DRT_{INV1}$ and a gate of the second drive element $DRT_{INV2}$ are commonly connected to an output terminal of the sweep signal generation unit 110, and an output terminal of the inverter 140 is connected to a gate of the switching element SWT of the constant current control unit 120. Accordingly, when a voltage of the sweep signal is higher than a preset voltage, the inverter 140 may quickly turn on the switching element SWT to quickly turn off the drive element $DRT_{CCG}$. In this way, as the inverter 140 is added, switching may be performed more quickly, and accordingly, the falling time of the constant current may be further reduced.

FIGS. 5 to 9 illustrate configurations and operations of a micro LED pixel circuit according to another embodiment of the present disclosure.

Basically, the configurations further include a circuit that additionally performs compensation operations of various switching elements while including the configuration of FIG. 4 in common. In order to apply a PWM driving method, a compensation process for electrical characteristics VTH dispersion of each switching element is required, and the configuration is also used in the well-known micro LED circuits.

Figure 5:
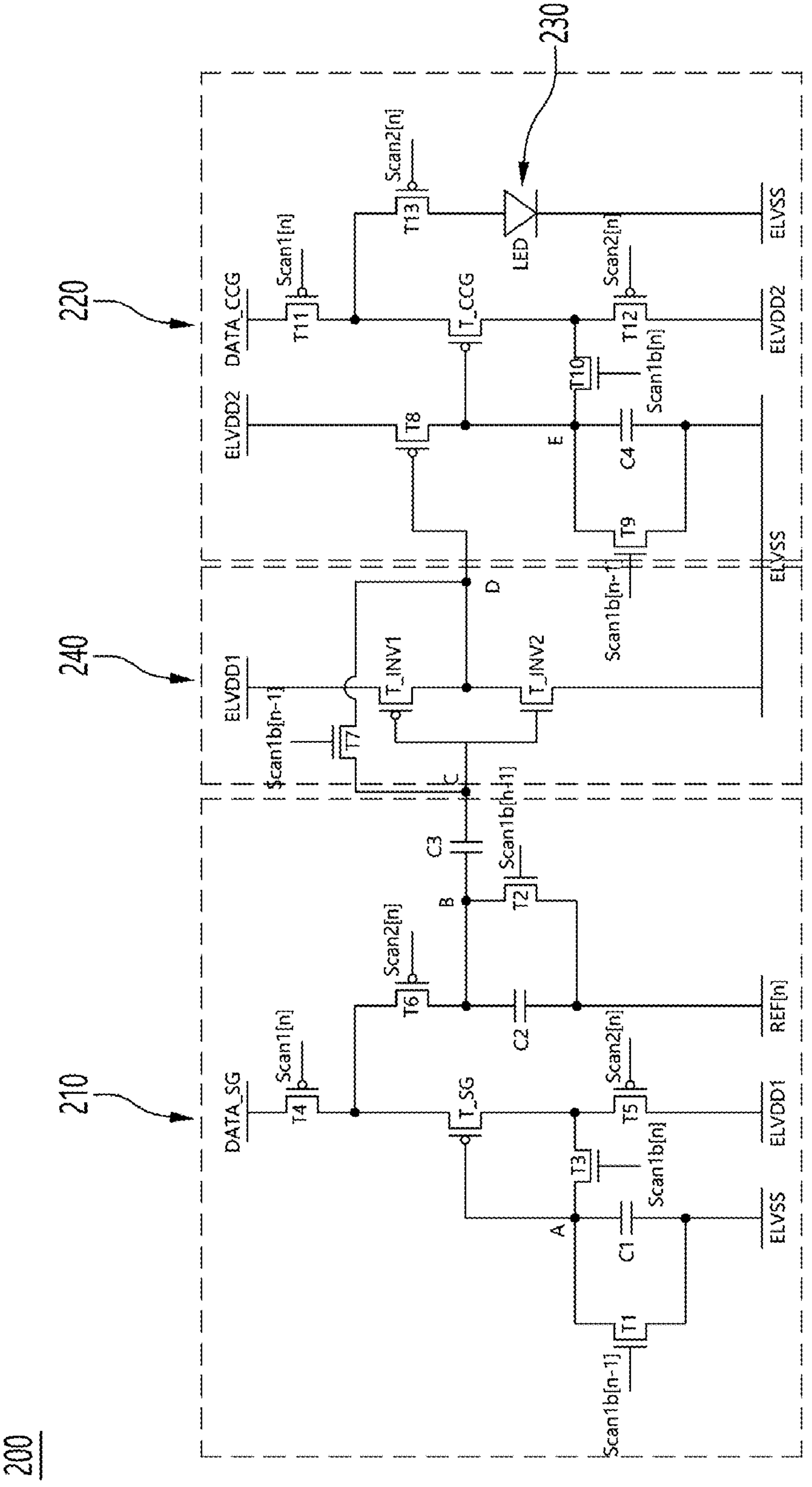
FIGS. 5 to 9 are diagrams illustrating configurations and operations of a micro LED pixel circuit according to another embodiment of the present disclosure.

As illustrated in FIG. 5, a micro LED pixel circuit 200 includes a sweep signal generation unit 210, a constant current control unit 220, a micro LED 230, and an inverter 240.

The sweep signal generation unit 210 includes a first capacitor C1 of which voltage is charged according to grayscale data DATA_SG, a drive element T_SG which generates a current being charged in the second capacitor C2 based on the voltage charged in the first capacitor C1, and a second capacitor C2 in which the current generated by the drive element T_SG is charged based on the voltage charged in the first capacitor C1. The voltage charged in the second capacitor C2 is output as a sweep signal.

In addition, the sweep signal generation unit 110 includes a switching element T1 which is turned on according to a first scan signal Scan1*b*[n−1] and is connected in parallel to both ends of the first capacitor C1, a switching element T2 which is turned on according to the first scan signal Scan1*b* [n−1] and is connected in parallel to both ends of the second capacitor C2, a switching element T3 that is turned on according to a second scan signal Scan1*b*[n] and is connected between the node A, which is one terminal of the first capacitor C1, and the other terminal of the drive element T_SG, a switching element T4 that transmits grayscale data DATA_SG_to the drive element SG according to a third scan signal Scan1[*n*], a switching element T5 that is turned on according to a fourth scan signal Scan2[*n*] and has one terminal connected to the other terminal of the drive element T_SG and the other terminal connected to a first power voltage ELVDD1, and a switching element T6 that is turned on according to the fourth scan signal Scan2[*n*] and has one terminal connected to the one terminal of the drive element T_SG and the other terminal of the switching element T4 and has the other terminal connected to a node B which is one terminal of the second capacitor C2. A reference signal REF[n] may be transmitted through the other terminal of the second capacitor C2 or the switching element T2.

Next, the constant current control unit 220 includes a fourth capacitor C4 in which constant current source data voltage is charged, a drive element T_CCG that transmits a constant current to the micro LED 130 according to the voltage charged in the first capacitor C4, and a switching element T8 that discharges the voltage charged in the first capacitor C4 and turns off the drive element T_CCG when the sweep signal output by a voltage of the sweep signal generation unit 210 is higher than a preset voltage. In this way, the constant current supply to the micro LED 230 is stopped as the drive element T_CCG is turned off. In this case, the steeper the slope of the voltage waveform of the sweep signal, the faster the switching element T8 is turned on, and accordingly, the drive element T_CCG is turned off more quickly to quickly reduce the light emission time of the micro LED 230 and the falling time of the constant current.

In addition, the constant current control unit 220 includes a switching element T9 that is turned on according to the first scan signal Scan1*b*[*n*−1] and is connected in parallel to both ends of the first capacitor C4, a switching element T10 that is turned on according to the second scan signal Scan1*b* [*n*] and is connected between a node E, which is one terminal of the first capacitor C4, and the other terminal of the drive element T_CCG, a switching element T11 that transmits the constant current source data voltage DATA_CCG to the fourth capacitor C4 according to the third scan signal Scan1[*n*], a switching element T12 that is turned on according to the fourth scan signal Scan2[*n*] and has one terminal connected to the other terminal of a drive element T_CCG and the other terminal connected to a second power voltage ELVDD2, and a switching element T13 that is turned on according to the fourth scan signal Scan2[*n*] and has one terminal connected to one terminal of the driving element T_CCG and the other terminal of the switching element T11 and has the other terminal connected to the micro LED.

In addition, the inverter 240 may include a first switching element T_INV1 of a first polarity and a second switching element T_INV2 of a second polarity, which are connected in series between the first power supply voltage ELVDD1 and the ground voltage ELVSS. In addition, the inverter 240 may further include a switching element T7 that is turned on according to the first scan signal Scan1*b*[*n*−1] and connected between an input node C and an output node D of the inverter 240.

Figure 6:
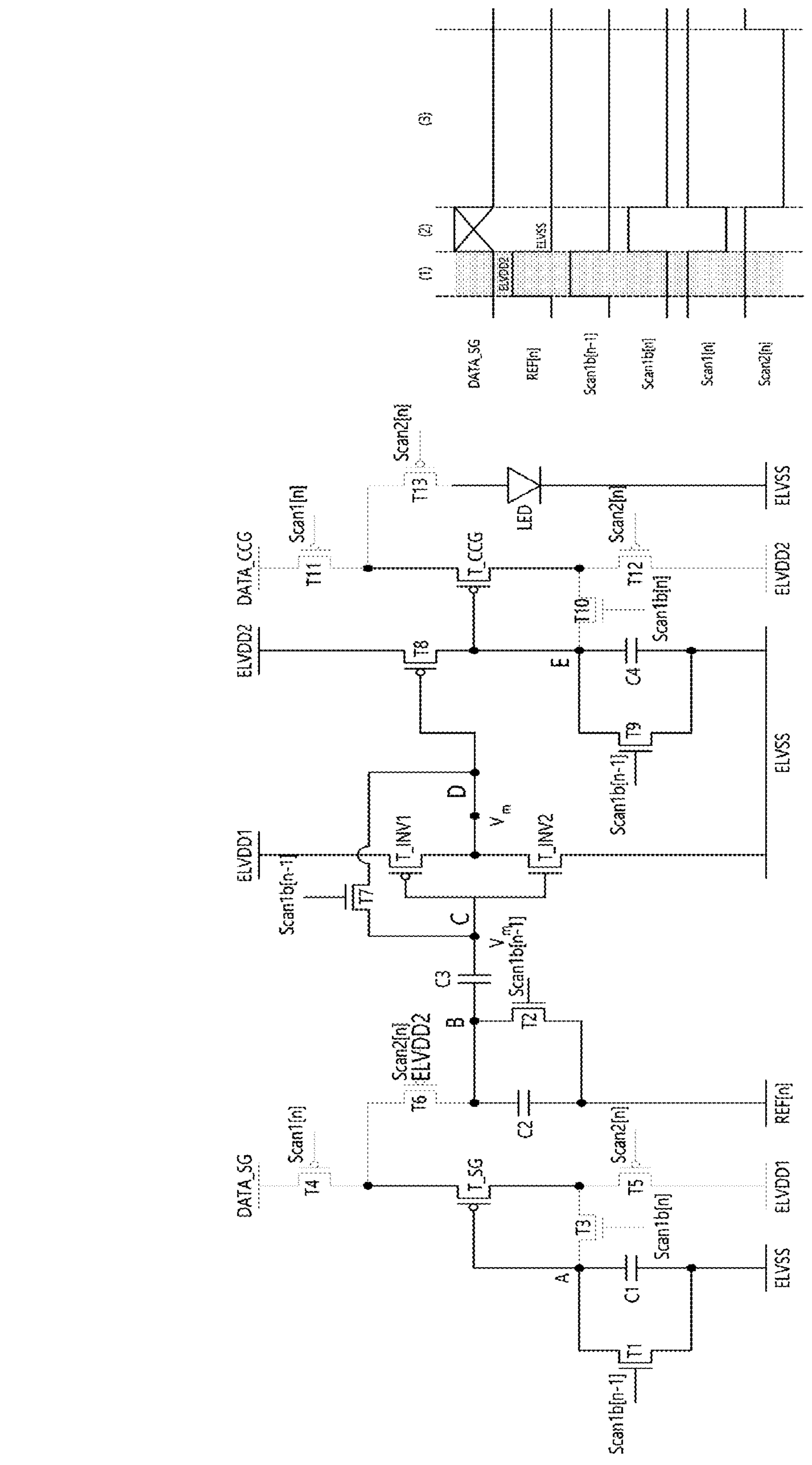
Figure 7:
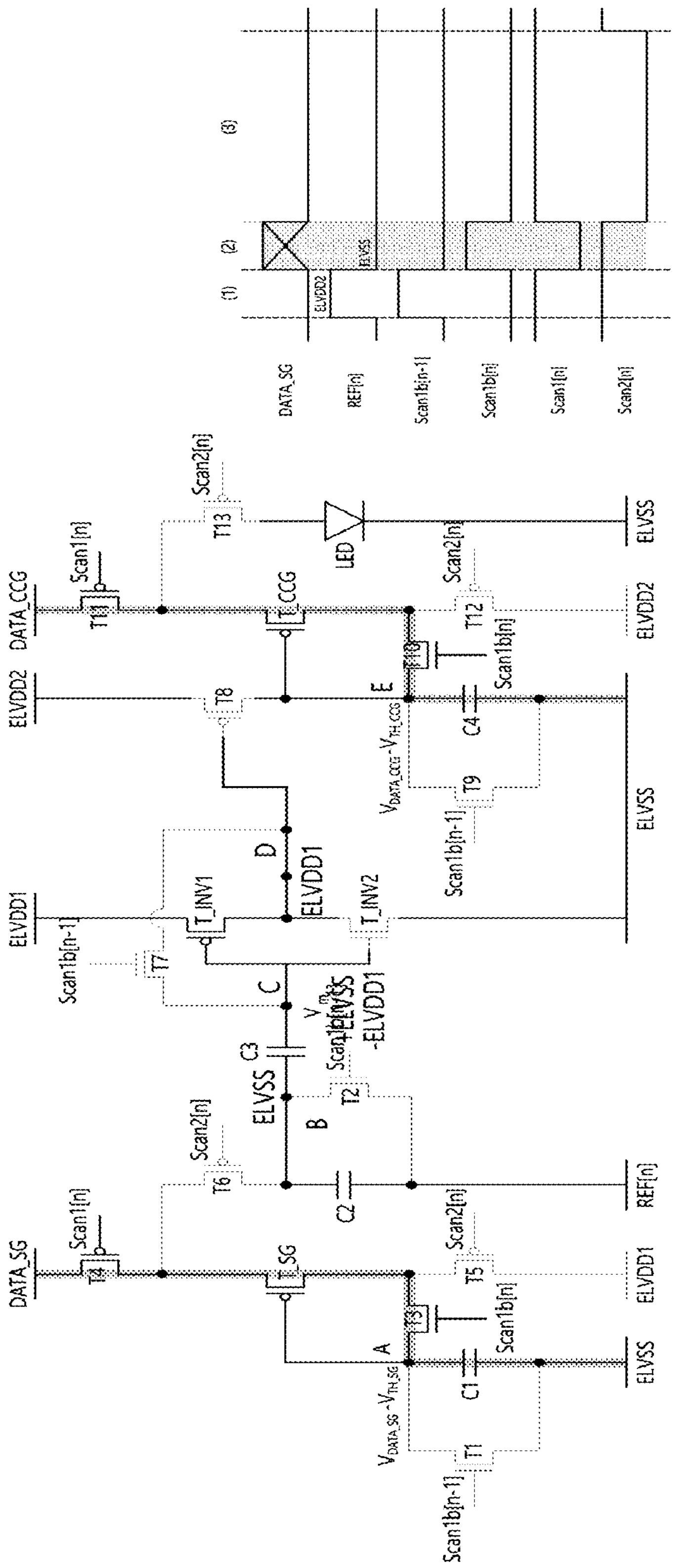
Figure 8:
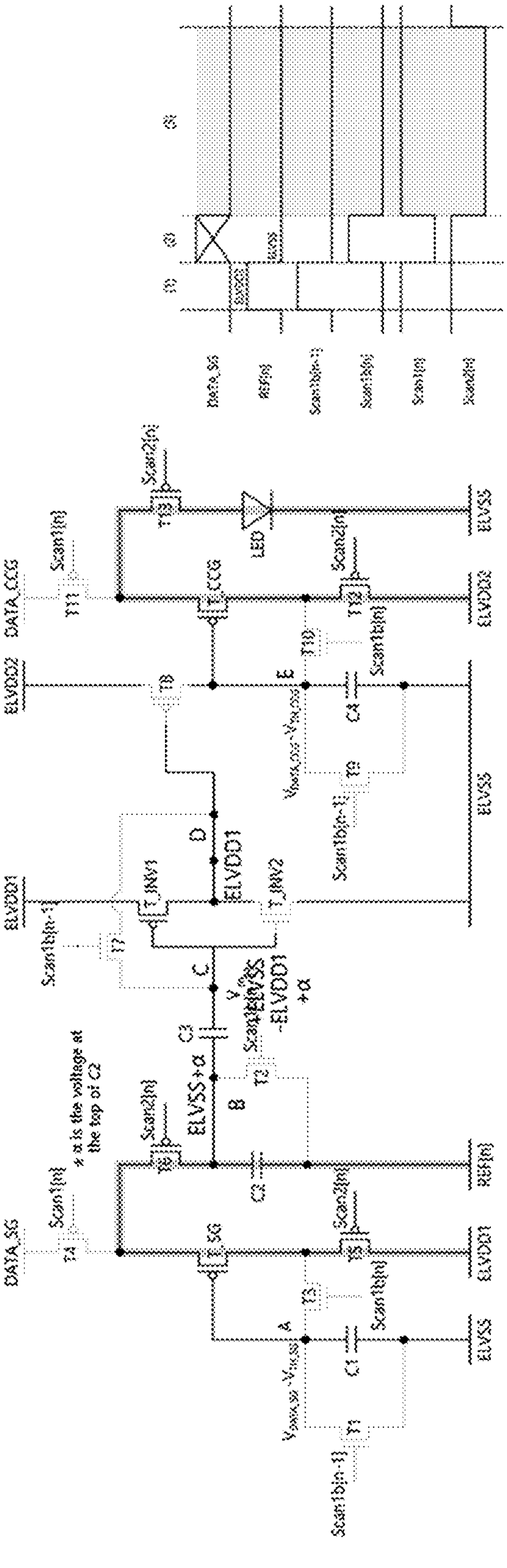
Figure 9:
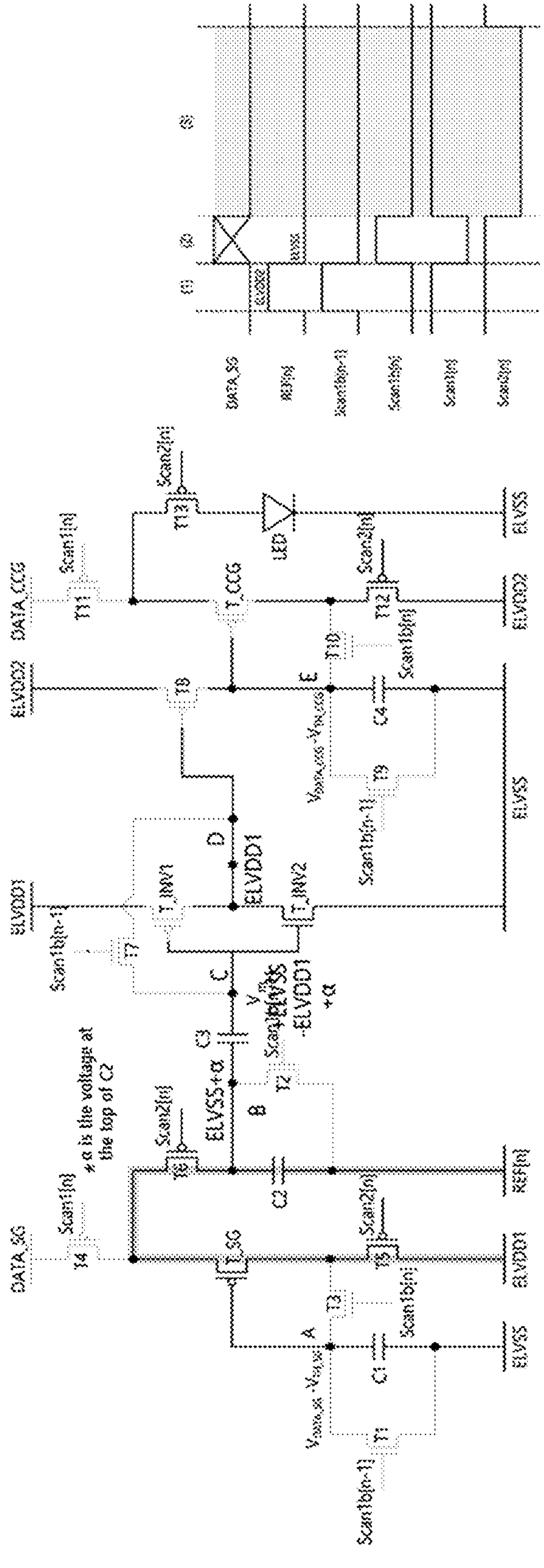

An operation of the pixel circuit may be divided into initialization and a compensation operation of the inverter 240 illustrated in FIG. 6, a compensation operation of the sweep signal generation unit 210 and the constant current control unit 220 illustrated in FIG. 7, and light-emitting operations illustrated in FIGS. 8 and 9.

(1) Initialization and Compensation Operation of the Inverter 240

First, in FIG. 6, the first scan signal Scan1*b*[n−1] is set to a high level to turn on the switching elements T1, T2, T7, and T9. Accordingly, voltages of the node A and the node E are reset to the ground voltage ELVSS, and a voltage of the node B is reset to the second power voltage ELVDD2 which is a high level voltage of the reference signal REF[n]. In addition, the node C which is an input node of the inverter 240 is connected to the node D which is an output node of the inverter 240 through the switching element T7, and accordingly, a switching threshold Vm of the inverter defined as VC=VD is sensed at the two nodes. In this case, the third scan signal Scan1[*n*] and the fourth scan signal Scan2[*n*] are set to a high level, and accordingly, PMOS switching transistors T4, T5, T6, T11, T12, and T13 to which corresponding signals are applied are respectively turned off. In addition, the second scan signal Scan1*b*[n] is set to a low level, and accordingly, NMOS switching transistors T3 and T10 to which corresponding signals are applied are also turned off.

(2) Compensation Operation of the Sweep Signal Generation Unit 210 and the Constant Current Control Unit 220

As illustrated in FIG. 7, the first scan signal Scan1*b*[*n*−1] and the third scan signal Scan1[*n*] are set to a low level, and the second scan signal Scan1$b[n]$ and the fourth scan signal Scan2$[n]$ are set to a high level. Accordingly, the switching elements T1, T2, T7, and T9 are turned off, and the switching elements T3, T4, T10, and T11 are turned on.

As a current flows through the first capacitor C1 of the sweep signal generation unit 210 and the fourth capacitor C4 of the constant current control unit 220, voltages of the node A and the node E respectively increase to VDATA_SG to VTH_SG and VDATA_CCG to VTH_CCG. Here, VTH_SG and VTH_CCG respectively represent threshold voltages of the drive element T_SG and the drive element T_CCG.

Meanwhile, the reference signal REF[n] is set to the ground voltage ELVSS which is in a low level, and accordingly, voltages of the node B and the node C respectively decrease to ELVSS and Vm+ELVSS−ELVDD2. Then, as first drive element T_INV1 of the inverter 240 is turned on, and the voltage of the node D increases to the first power voltage ELVDD1. As a result, the switching element T8 is maintained in an off state throughout this step.

(3) Light-Emitting Operation

As illustrated in FIG. 8, the first scan signal Scan1$b[n-1]$, the second scan signal Scan1$b[n]$, and the fourth scan signal Scan2$[n]$ are set to a low level, and the third scan signal Scan1$[n]$ is set to a high level. As a result, the switching elements T3, T4, T10, and T11 are turned off, and the switching elements T5, T6, T12, and T13 are turned on.

The second capacitor C2 is charged by a current passing through the drive element T_SG, and accordingly, the voltage of node B increases linearly over time and functions as a sweep signal. At the same time, the voltage of the node C also increases together with the voltage of the node B due to charge conservation.

In addition, as illustrated in FIG. 9, when the voltage of the node B reaches the second power voltage ELVDD2 and the voltage of the node C exceeds Vm, the first drive element T_INV1 of the inverter 240 is turned off and the second drive element T_INV2 is turned on. Then, the voltage of the node D decreases to the ground voltage ELVSS, and accordingly, the second switching element T8 is turned on. Thereafter, the voltage of the node E increases to the second power voltage ELVDD2.

Therefore, a source-gate voltage VSG of the drive element T_CCG is reduced to be less than a threshold voltage and is blocked, and accordingly, the drive element T_CCG may not supply a current to the micro LED 230.

FIG. 10A to FIG. 11D are graphs showing experimental results of a micro LED pixel circuit according to an embodiment of the present disclosure.

Figure 10A:
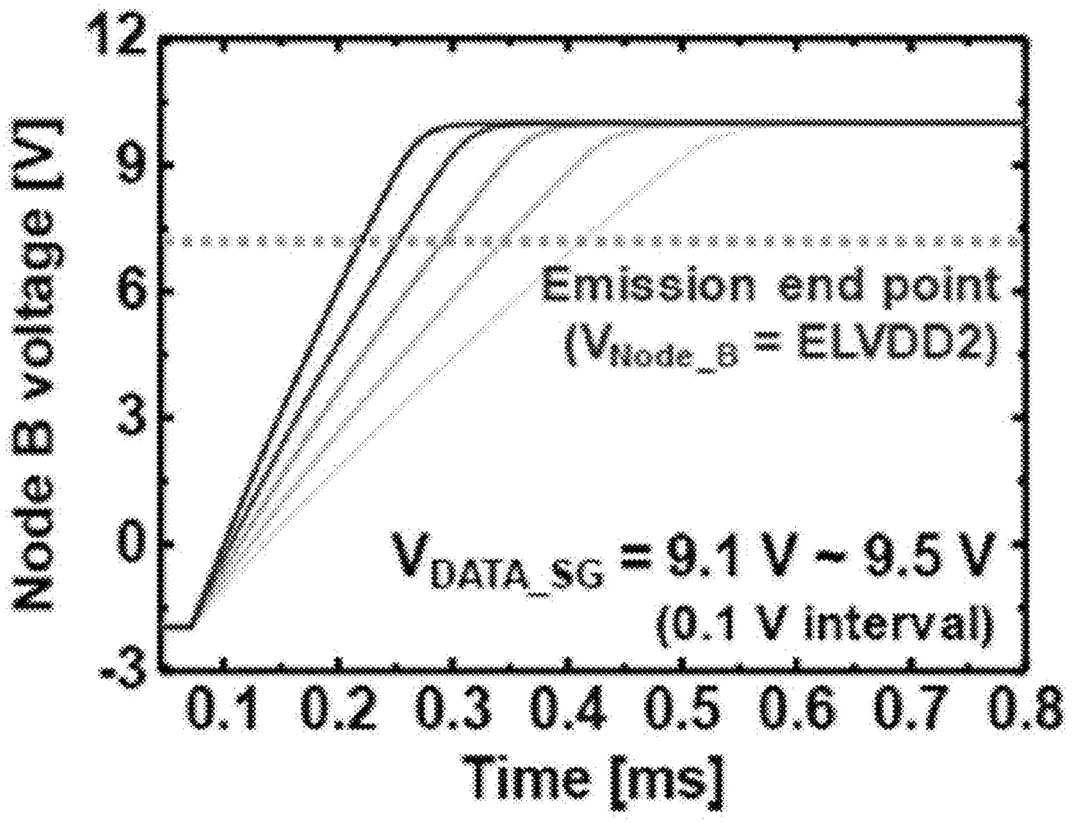
FIGS. 10A and 11D are graphs illustrating experimental results of a micro LED pixel circuit according to an embodiment of the present disclosure.
Figure 10B:
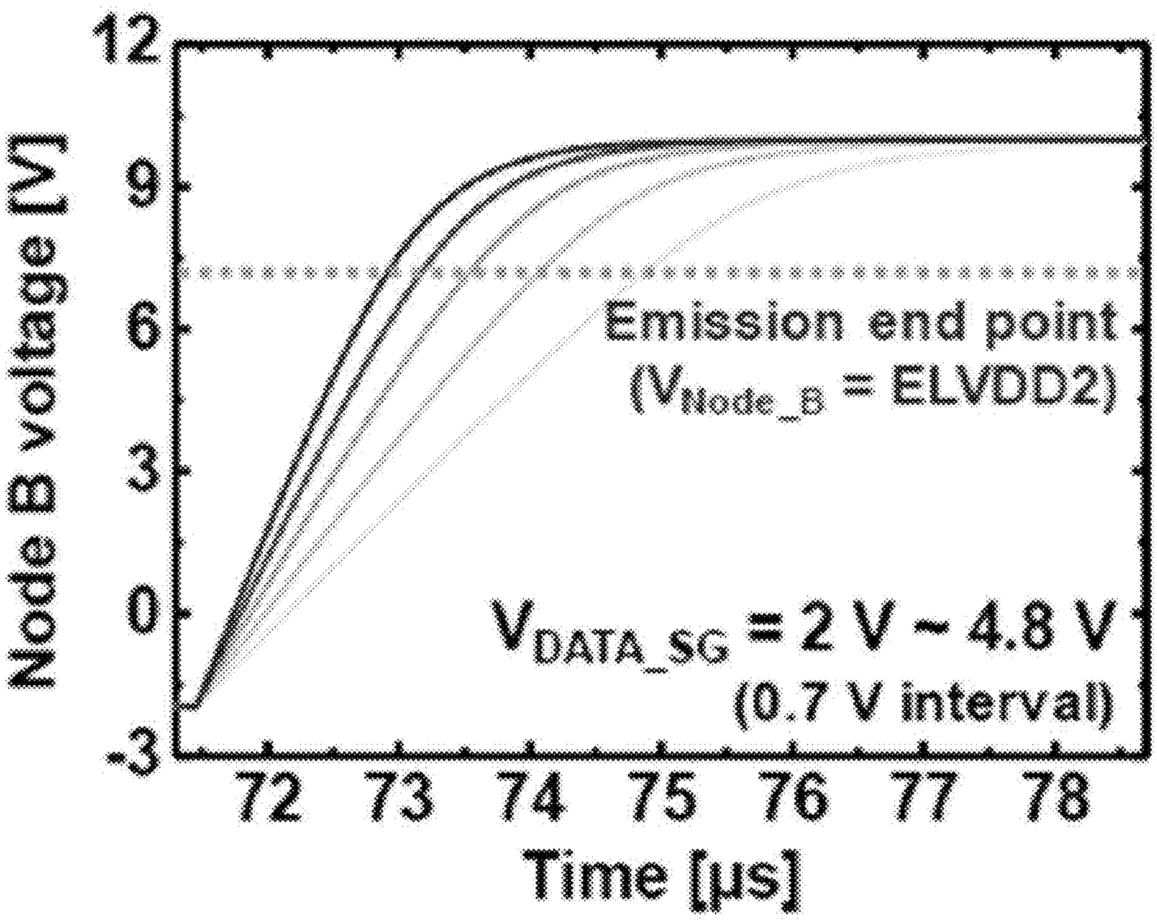

FIG. 10A illustrates a voltage level of a sweep signal for high grayscale data, and FIG. 10B illustrates a voltage level of the sweep signal for low grayscale data. As suggested by the present disclosure, it can be seen that a slope of a sweep signal changes according to grayscale data, and in particular, the slope of the sweep signal is increased more for low grayscale data.

Figure 10C:
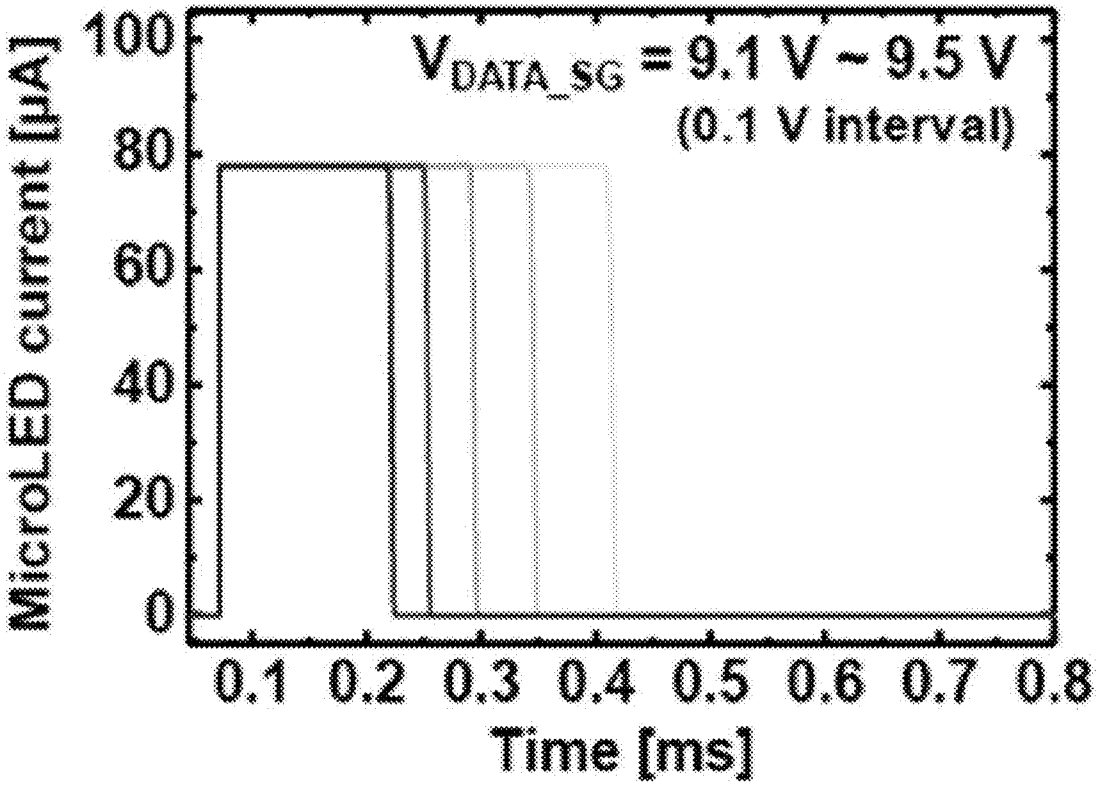
Figure 10D:
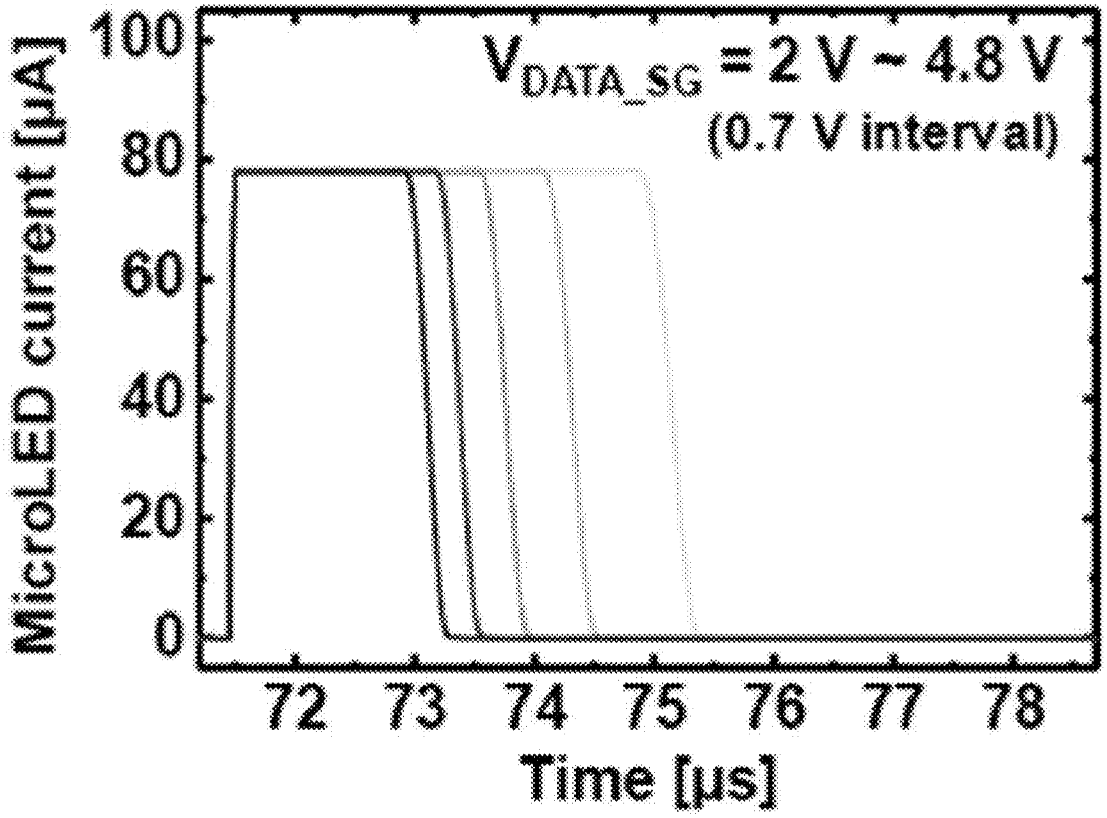

In addition, FIG. 10C illustrates a constant current for high grayscale data, and FIG. 10D illustrates a constant current for low grayscale data. As a slope of the sweep signal is increased more for the low grayscale data, the falling time may be further reduced.

Figure 11A:
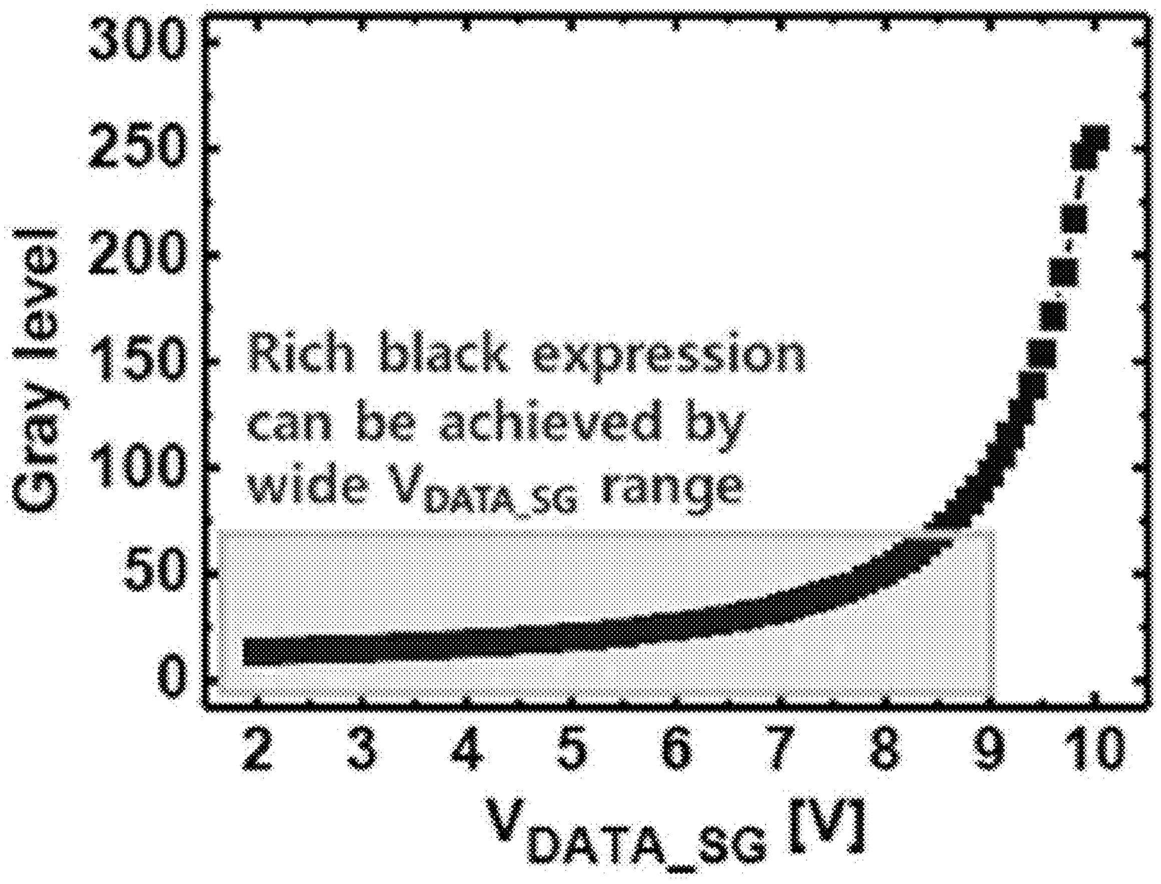
Figure 11B:
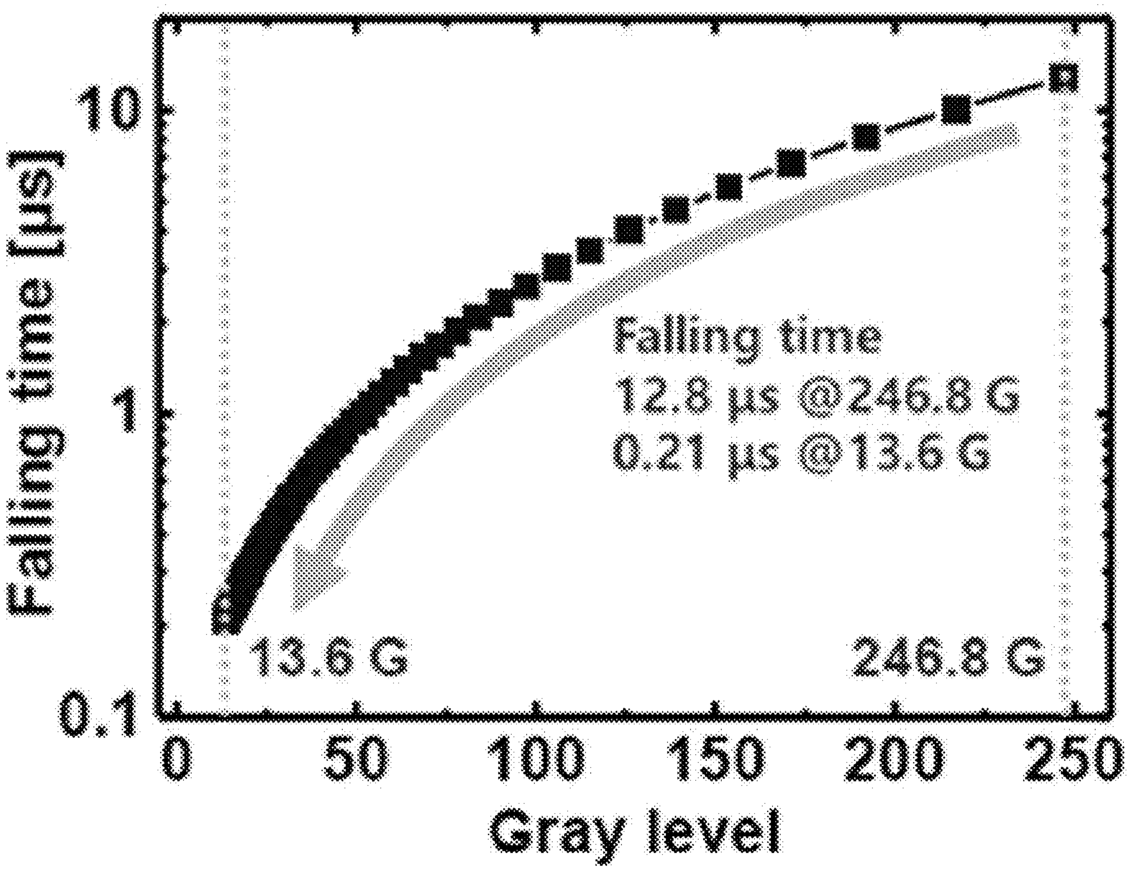
Figure 11C:
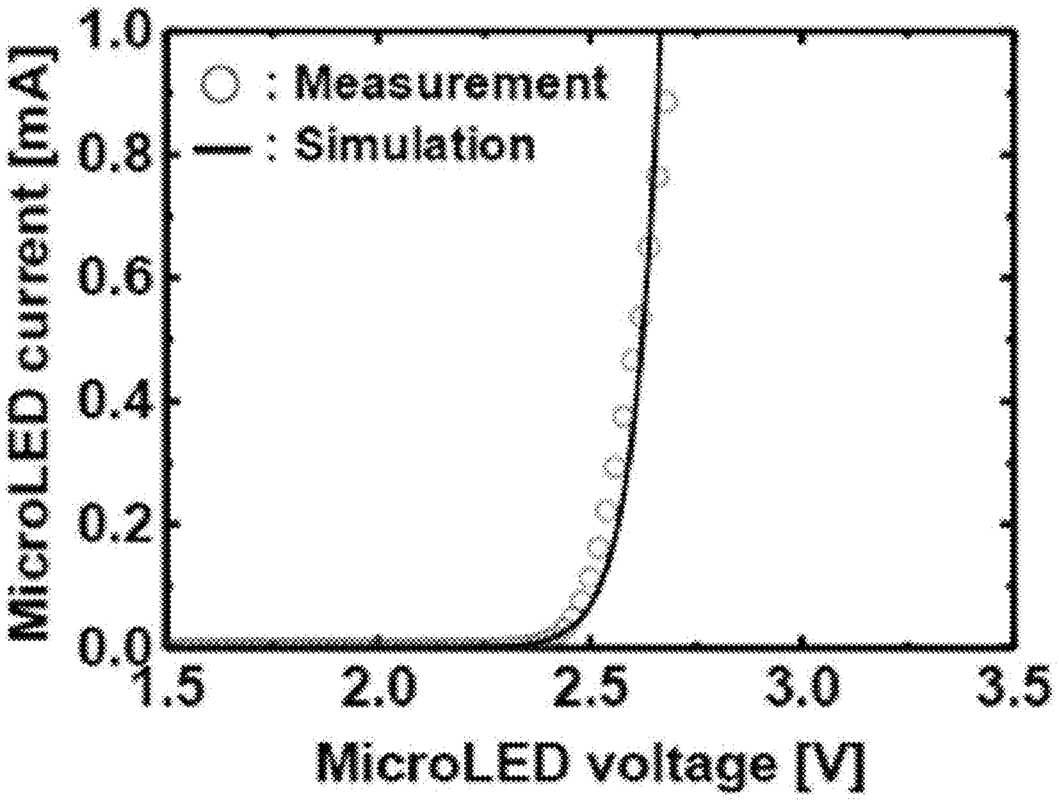
Figure 11D:
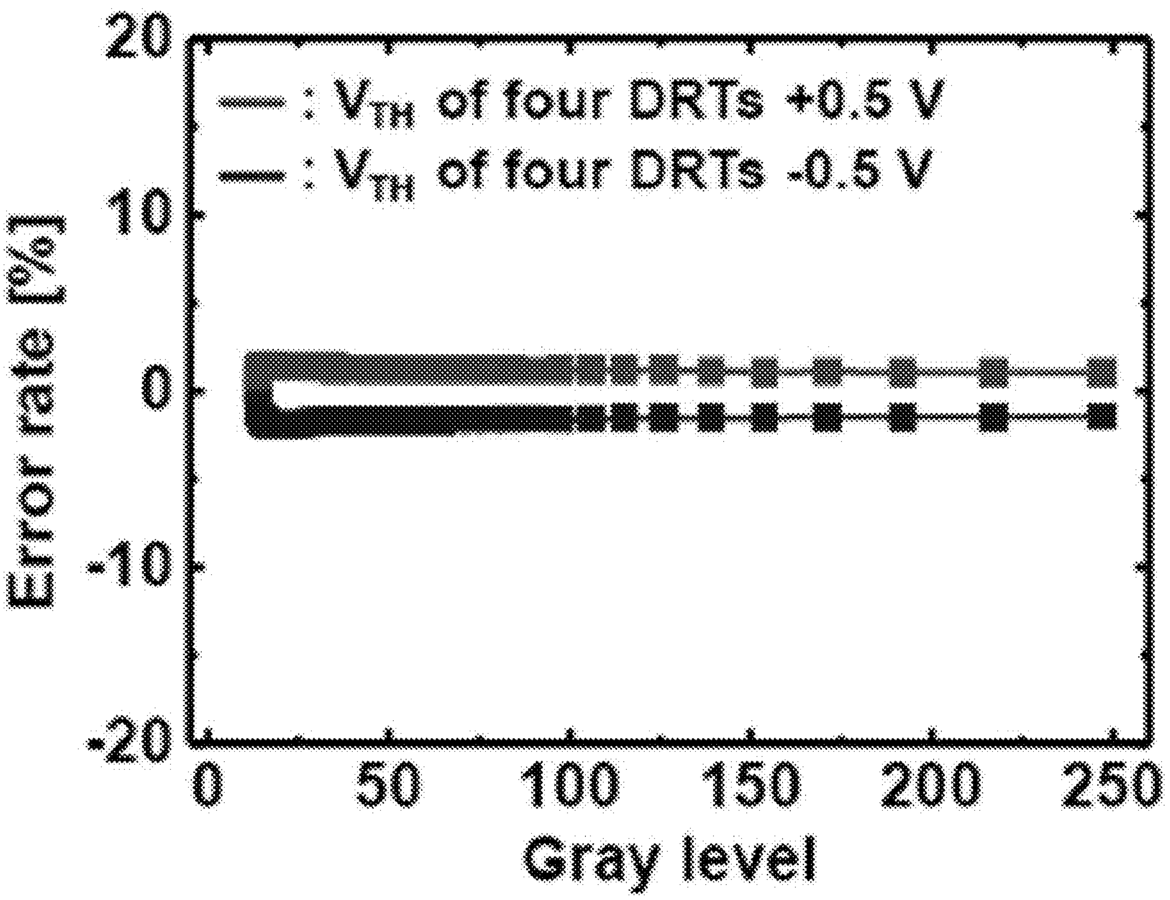

This may also be confirmed in the graph of FIGS. 11A to 11D. FIG. 11A illustrates a grayscale level according to grayscale data VDATA_SG, and FIG. 11B illustrates that falling times are different for each grayscale level.

In this way, a micro LED display may be implemented by including multiple micro LED pixel circuits which are arranged in an array form.

The above description of the present disclosure is for illustrative purposes only, and those skilled in the art to which the present disclosure belongs will understand that the present disclosure may be easily modified into another specific form based on the descriptions given above without changing the technical idea or essential features of the present disclosure. Therefore, the embodiments described above should be understood as illustrative in all respects and not limiting. For example, each component described as single may be implemented in a distributed manner, and similarly, components described as distributed may also be implemented in a combined form.

The scope of the present disclosure is indicated by the claims described below rather than the detailed description above, and all changes or modified forms derived from the meaning and scope of the claims and their equivalent concepts should be construed as being included in the scope of the present disclosure.

What is claimed is:

1. A micro light emitting diode (LED) pixel circuit driven using pulse width modulation (PWM), the micro LED pixel circuit comprising:

a sweep signal generation unit configured to output a sweep signal having a slope which is adjusted according to grayscale data;

a constant current control unit configured to supply a constant current and control whether to stop supply of the constant current according to the sweep signal output by the sweep signal generation unit; and a micro LED driven by the constant current.

2. The micro LED pixel circuit of claim 1, wherein the grayscale data includes a plurality of data values representing a low grayscale and a high grayscale, the sweep signal generation unit generates the sweep signal such that a slope of a voltage waveform of the sweep signal increases as a grayscale represented by the grayscale data decreases, and the constant current control unit causes a falling time of the constant current to decrease as the slope of the sweep signal increases.

3. The micro LED pixel circuit of claim 1, further comprising:

an inverter connected between the sweep signal generation unit and the constant current control unit, wherein the inverter causes the constant current control unit to output a signal for stopping the supply of the constant current when the sweep signal exceeds a preset voltage.

4. The micro LED pixel circuit of claim 1, wherein the sweep signal generation unit includes a first capacitor which is charged according to the grayscale data; a drive element configured to generate a current that charges a second capacitor based on the voltage stored on the first capacitor and a voltage is thereby stored on the first capacitor; and the second capacitor is charged based on the voltage stored on the first capacitor, a voltage stored on the second capacitor is output as the sweep signal, and the voltage stored on the first capacitor and the voltage stored on the second capacitor increase as the grayscale indicated by the grayscale data decreases.

5. The micro LED pixel circuit of claim 4, wherein the constant current control unit includes a first capacitor which is charged by a constant current source data voltage; a drive element configured to transmit the constant current to the micro LED according to a voltage stored on the first capacitor; and a switching element configured to discharge the voltage stored on the first capacitor to turn off the drive element when the sweep signal exceeds a preset voltage, and supply of the constant current is stopped as the drive element is turned off.

6. The micro LED pixel circuit of claim 5, further comprising:

an inverter connected between the sweep signal generating unit and the constant current control unit, wherein, when the sweep signal exceeds the preset voltage, the inverter turns on the switching element of the constant current control unit to turn off the drive element of the constant current control unit.

7. A micro LED display comprising:

a plurality of micro LED pixel circuits according to claim 1.

* * * * *